United States Patent
Chestnut et al.

(10) Patent No.: US 9,911,128 B2
(45) Date of Patent: Mar. 6, 2018

(54) SYSTEMS AND METHODS FOR DETERMINING AND SENDING A PREFERRED OF TWO ELECTRONIC MAIL COMMUNICATIONS

(75) Inventors: Ben Chestnut, Atlanta, GA (US); Mark Armstrong, Smyrna, GA (US); Chadwick Morris, Marietta, GA (US)

(73) Assignee: The Rocket Science Group LLC, Atlanta, GA (US)

( * ) Notice: Subject to any disclaimer, the term of this patent is extended or adjusted under 35 U.S.C. 154(b) by 1467 days.

(21) Appl. No.: 12/740,079

(22) PCT Filed: Oct. 31, 2008

(86) PCT No.: PCT/US2008/082164
§ 371 (c)(1),
(2), (4) Date: Aug. 24, 2010

(87) PCT Pub. No.: WO2009/059258
PCT Pub. Date: May 7, 2009

(65) Prior Publication Data
US 2010/0312840 A1    Dec. 9, 2010

Related U.S. Application Data

(60) Provisional application No. 60/984,232, filed on Oct. 31, 2007.

(51) Int. Cl.
*G06F 15/16* (2006.01)
*G06Q 30/02* (2012.01)

(52) U.S. Cl.
CPC ................................. *G06Q 30/02* (2013.01)

(58) Field of Classification Search
CPC .................................................. H04L 65/4023
(Continued)

(56) References Cited

U.S. PATENT DOCUMENTS

| 6,769,002 B2 | 7/2004 | Ayan |
| 7,251,696 B1 | 7/2007 | Horvitz |

(Continued)

FOREIGN PATENT DOCUMENTS

| GB | 1003231 | 9/1965 | |
| WO | WO2001048964 A2 * | 7/2001 | ............. G06Q 30/00 |

(Continued)

OTHER PUBLICATIONS

Bryan Eisenberg, ClickZ Testing, How Start-Ups Can Build Effective "About Us" Pages, Oct. 26, 2007, www.clickz.com.
(Continued)

*Primary Examiner* — S M Rahman
(74) *Attorney, Agent, or Firm* — Kilpatrick Townsend & Stockton LLP

(57) ABSTRACT

Systems and methods for determining and sending a preferred of two electronic mail communications or messages ('emails') to a group to increase likelihood of its review. Information for conducting a test between two emails, referred to as A email and B email, is collected. The information may identify a particular group, and segments A and B of the group. The information may provide content for the emails and include differentiation information between the emails. Determination information on how to select one of the emails as the preferred email and when to select the preferred email may be collected. The information is used to send the A email to the segment A, to send the B email to the segment B, to determine the preferred email between the A email and the B email, and to send the preferred email to at least a portion of the particular group.

14 Claims, 14 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2002/0091940 A1* | 7/2002 | Welborn ............... | G06F 21/566 726/22 |
| 2002/0120600 A1* | 8/2002 | Schiavone et al. ................ | 707/1 |
| 2003/0052915 A1 | 3/2003 | Brown et al. | |
| 2004/0225437 A1 | 11/2004 | Endo et al. | |
| 2005/0188019 A1* | 8/2005 | Mittelstaedt ......... | G06Q 10/107 709/206 |
| 2006/0112163 A1* | 5/2006 | Enatsu et al. .................. | 709/203 |
| 2006/0200523 A1* | 9/2006 | Tokuda ................ | G06Q 10/107 709/206 |
| 2007/0112920 A1 | 5/2007 | Hay | |
| 2007/0192425 A1 | 8/2007 | Pous et al. | |
| 2007/0226389 A1 | 9/2007 | Poortman | |
| 2007/0233790 A1* | 10/2007 | Agarwal .............. | G06Q 10/107 709/206 |
| 2008/0091510 A1* | 4/2008 | Crandall ................ | G06Q 30/02 705/7.32 |

FOREIGN PATENT DOCUMENTS

| | | |
|---|---|---|
| WO | 2009059258 | 5/2009 |
| WO | 2009059258 | 1/2010 |

OTHER PUBLICATIONS

Rich Brooks, Email Marketing Needs A/B Testing, Web Marketing Strategies for Small Business, Oct. 30, 2007, www.flyteblog.com.
Bryan Eisenberg, ClickZ A/B Testing for the Mathematically Disinclined, May 7, 2004, www.clickz.com.
Getting the Right Message Out—As Easy as A/B, Email Marketing Campaign, Oct. 30, 2007, www.emailmarketingcampaign.info.
6 Ideas for Segmenting Your Lists, VerticalResponse Email Marketing Blog, Sep. 26, 2007, http://blog.verticalresponse.com.
CampaignerPro Feature Summary, got corporation.
International Application No. PCT/US2008/082164, International Preliminary Report on Patentability dated May 4, 2010, 5 pages.
International Application No. PCT/US2008/082164, International Search Report and Written Opinion dated Feb. 13, 2009, 5 pages.

* cited by examiner

Figure 4

SYSTEMS AND METHODS FOR DETERMINING AND SENDING A PREFERRED OF TWO ELECTRONIC MAIL COMMUNICATIONS

SYSTEMS AND METHODS FOR DETERMINING AND SENDING A PREFERRED OF TWO ELECTRONIC MAIL COMMUNICATIONS, which was filed with the United States Patent and Trademark Office on Oct. 31, 2007, which was assigned U.S. Application Ser. No. 60/984,232, and which is incorporated herein by reference.

FIELD OF THE INVENTIONS

The inventions relate to the communication of information. More particularly, the inventions relate to the communication of information so that it is more likely to be reviewed upon receipt.

BACKGROUND

The present millennium has been referred to as the Information Age. But too much information may mean that at least some of it may be ignored, overlooked, lost or otherwise not received or reviewed. Among the problems of a communicator trying to get its message out is to make as sure as possible that its communications are received and reviewed, and not ignored, overlooked, or lost.

SUMMARY

Generally stated, the inventions relate to systems and methods for facilitating success of an email campaign by determining which of at least two electronic mail messages ("emails") is acted on more than the other. An exemplary embodiment creates a first email and a second email, where the first email and second email differ by a selected characteristic. The first email is sent to a first segment of a group. The second email is sent to a second segment of the group. A determination is made as to which of the emails is acted on by more members of its respective segment. The email determined to be more acted on is sent to one or more members of the group. An alternative to this embodiment may create more than two emails, send them respectively to more than two segments of the group, and determine which email from the more than two emails is acted on by members of its group than the other emails.

Another exemplary embodiment of the inventions includes a method for determining which email of two or more emails is more likely to be reviewed by a group and sending that email to the group. This method identifies a segment of the group to correspond respectively to each of the two or more emails. A characteristic is selected to differ respectively among the two or more emails. One of the two or more emails with the differing characteristics is sent to each of the respective segments of the group. A determination is made as to which of the two or more emails with the different characteristics is reviewed by more members of its segment of the group than other segments. The determined email is sent to one or more of the group.

Yet another exemplary embodiment of the inventions is a method for determining and sending a preferred of two electronic mail messages ("emails"). In this embodiment, information is received for conducting an A/B split test between the two emails, referred to as A email and as B email. The information may identify a particular group, identify a segment A of the particular group, identify a segment B of the particular group, provide content for the two emails, include differentiation information between the two emails, and include determination information on how to select one of the two emails as the preferred email and when to select the preferred email. The information also may include send information on when to send the preferred email to at least the portion of the particular group. The information may be used to send the A email to the segment A, to send the B email to the segment B, to determine the preferred email between the A email and the B email, and to send the preferred email to at least a portion of the particular group. The send information may be used to send the preferred email to at least the portion of the particular group according to the send information.

The exemplary embodiment may include other features. For example, the exemplary method may facilitate the receipt of the differentiation information between the two emails by providing one or more input areas for the differentiation information. In an embodiment, the differentiation information between the two emails may be different subject lines respectively between the two emails, may be different "from" names respectively between the two emails, may be different delivery dates respectively between the two emails, and or may be different delivery times respectively between the two emails.

The exemplary embodiment also may facilitate the identification of the segment A by providing a mechanism whereby a randomly chosen percentage of between about 5%-50% participants of the particular group is selectable to be identified as the segment A. The exemplary embodiment may provide the same with respect to segment B.

Further, the exemplary embodiment may facilitate the receipt of the determination information on how to select one of the two emails as the preferred email by providing one or more choices of a method of determination. The exemplary embodiment may facilitate the provision of the determination information on when to select one of the two emails as the preferred email by providing one or more time choices. The exemplary embodiment may facilitate the identification of the particular group by allowing a subset of a group of recipients to be selected as the particular group. The exemplary embodiment may facilitate the subset to be selected based on one, two or three common conditions. The exemplary embodiment may facilitate creation of the content for the two emails. The exemplary embodiment may facilitate by providing a pre-delivery checklist. The exemplary embodiment may facilitate making status information relating to the A email and the B email available. The exemplary embodiment may make a final report relating to the A email and the B email available.

BRIEF DESCRIPTION OF THE DRAWINGS

FIGS. 4-14 are screen shots of an exemplary embodiment of the inventions.

DETAILED DESCRIPTION

The inventions are described herein with reference to exemplary embodiments, alternative embodiments, and also with reference to the attached drawings. The inventions, however, can be embodied in many different forms and carried out in a variety of ways, and should not be construed as limited to the embodiments set forth in this description and/or the drawings. The exemplary embodiments that are described and shown herein are only some of the ways to implement the inventions. Elements and/or actions of the inventions may be assembled, connected, configured, and/or taken in an order different in whole or in part from the descriptions herein.

For example, the exemplary embodiments presented below refer select a "winning" email between two emails. But other embodiments may select a winning email from more than two emails. Individual actions or elements of these other embodiments may differ in whole or in part from the actions or elements presented herein.

Figure 1:
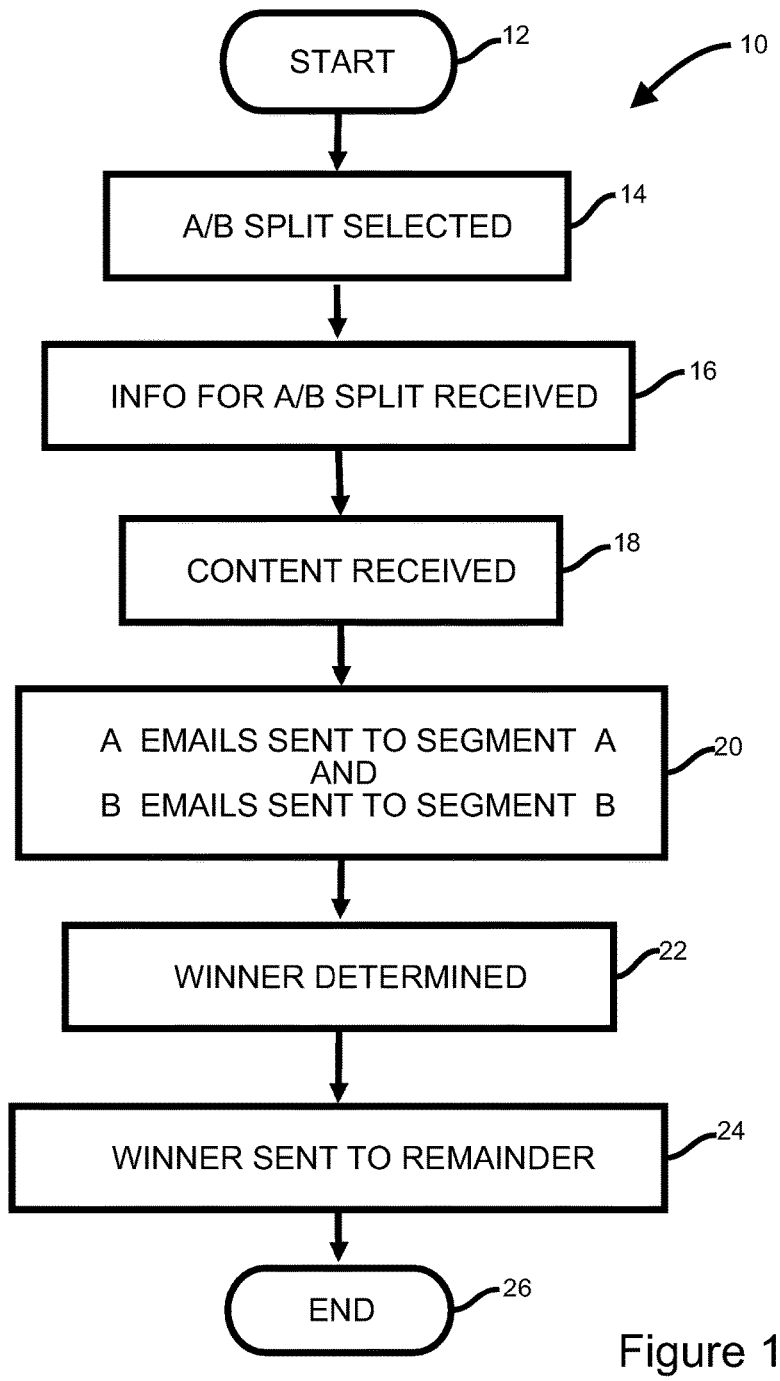
FIG. 1 is a flowchart of an exemplary embodiment of the inventions.

Overview—FIG. 1

Generally stated, the inventions relate to methods and systems for determining a preferred electronic mail message (email), and for sending that preferred email after such determination. For example, the preferred email may be determined between two emails. Particularly, the inventions relate to methods and systems for determining a preferred email for a particular group of recipients by sending the test emails to respective segments of the particular group. For example, two test emails may be sent respectively to two segments of the particular group. The determination of the preferred email may be carried by A/B split testing. Upon determination of the preferred email, it may be sent to the remainder of the particular group.

FIG. 1 is a flow diagram illustrating an overview of an exemplary method 10 according to the inventions. After a discussion associated with FIG. 1, further details are provided below in connection with the other figures including screen shots.

According to the exemplary method as shown in FIG. 1, after start 12, in action 14 A/B split testing is selected as the process for determining which of two emails is to be sent to recipients designated as a particular group. The two emails are referred to herein as the "A email" and the "B email". The A email will be sent to a certain percentage of the recipients of the particular group referred to herein as "segment A". The B email will be sent to a certain percentage of the recipients of the particular group referred to herein as "segment B". The recipients of the particular group who are not part of either segments A or B are referred to herein as the "remainder of the recipients".

In action 16 of FIG. 1, information for the A/B split testing is received. The information may include: information differentiating the A email from the B email; the percentage(s) of recipients of the particular group that constitutes respectively segment A and segment B; information on how to determine the preferred email as between the A email and the B email; and when to make the determination as to the preferred email. The received information also may include information on when to send the preferred email to the remainder of the particular group, as well as other information or data.

In action 18 of FIG. 1, the content(s) for the A and B emails is/are received. Generally, this content is the same except for the information differentiating the A email from the B email mentioned above. The content may include a designation of the particular group to whom the A and B emails, and the preferred email are to be sent. The content may include the subject matter of the A and B emails.

In action 20, the A emails are sent to segment A of the particular group and the B emails are sent to segment B. In action 22, the preferred email as between the A and B emails is determined. The preferred email may be determined in a manner and at a time previously provided. In action 24, the preferred email is sent to the remainder of the particular group. The preferred email may be sent automatically upon determination of the preferred email. The preferred email may be sent at a time previously provided. The preferred email is also referred to herein as the "winner" or the "winning email". The exemplary method ends in action 26.

Figure 2:
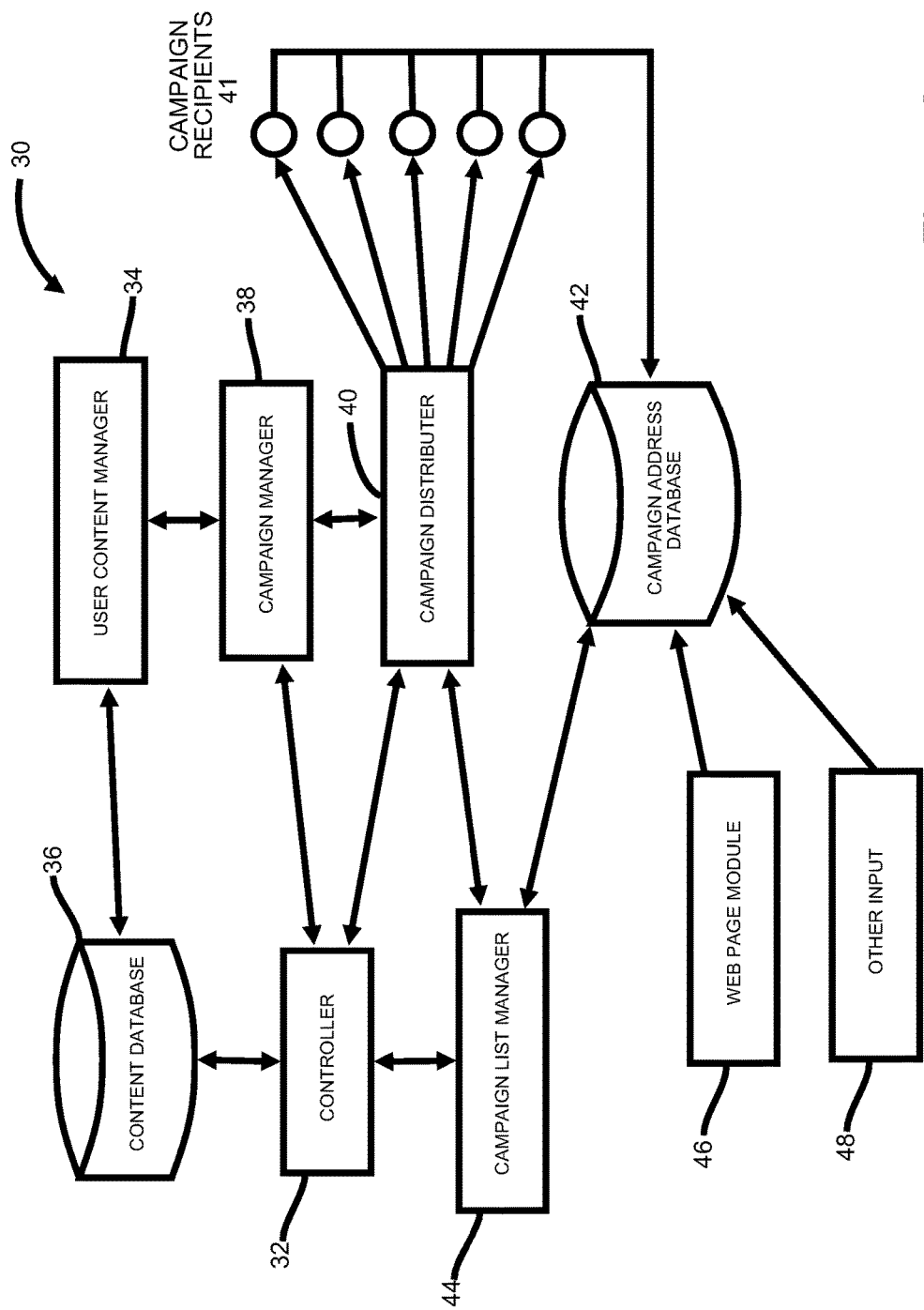
FIG. 2 is a block diagram of an exemplary environment for operation of an exemplary embodiment of the inventions.

Exemplary System Overview—FIG. 2

The inventions may be used in many different environments. An exemplary environment is an email communication system that provides tools for creating electronic mail messages that may be or may include advertising, advice, announcements, campaigns, news, newsletters, reports, solicitations, and/or other information. Such an email communication system also may provide tools for performing related tasks such as content creation, email address list management, email distribution, email tracking and follow-up such as reports and analysis.

The patent to Ayan, U.S. Pat. No. 6,769,002 is entitled a System and Methods for Multilevel Electronic Mail Communication Programs. This patent is incorporated herein by reference.

FIG. 2 illustrates a general structure of an exemplary email communication system 30 as may be used with the inventions. The "brains" or "smarts" of the system 30 is the controller 32 that may include at least part of the logic as necessary to implement and manage operation of the inventions in the exemplary system 30. Generally, the controller 32 interfaces with the other elements of the system 30. The controller 32 may perform a variety of system administration and configuration functions. The controller 32 may configure the system 30 to define a campaign, a marketing program, an advertising plan, or like scheme, and their participants in accordance with the structures of the campaign, program, plan or scheme to be served.

Other elements of system 30 include the user content manager 34. It may provide tools that enable a user to create and edit user content. The user content may be stored in the content database 36. The campaign manager 38 may provide tools that enable a user to create and edit email messages such as may be used in email campaigns. An email campaign is used herein to refer to the process of sending an email (generally the same email) to a particular group of people. The campaign manager 38 interfaces with a campaign distributor 40 that prepares and sends the emails in a campaign to campaign recipients 41 using email addresses stored in address lists of a campaign address database 42. The campaign address database 42 and the content database 36 may be implemented using a single database system.

Addresses in the campaign address database 42 may be entered and organized using tools provided by a campaign list manager 44. Addresses may also be entered into the campaign address database 42 from web page modules 46 that may be placed on program participants' web pages to allow interested parties to subscribe to receive email messages and campaigns on an opt-in basis.

As noted, the system 30 is an exemplary system. Other configurations for implementation and use of the inventions are possible.

Figure 3:
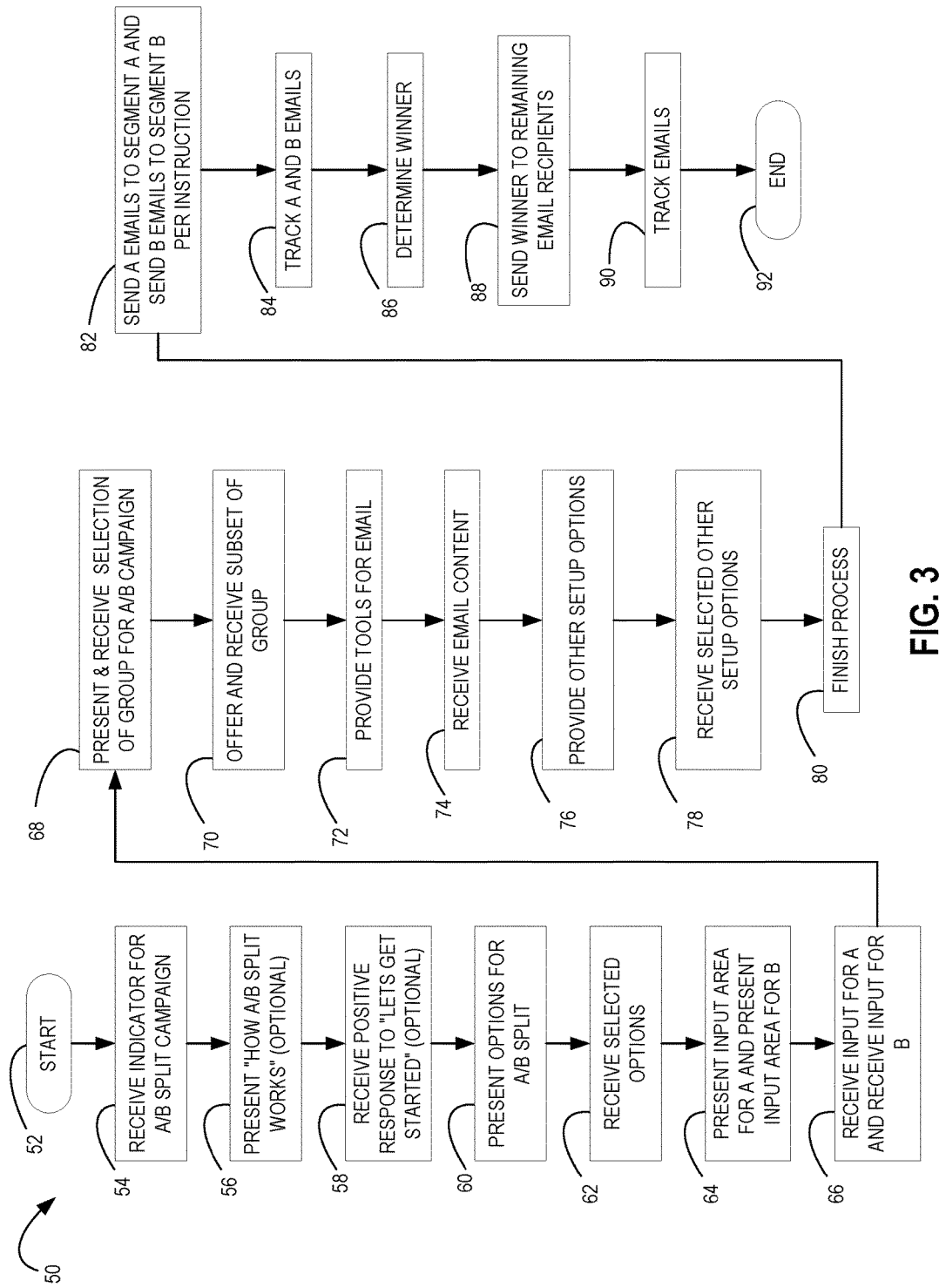
FIG. 3 is a flowchart of an exemplary embodiment of the inventions.

Exemplary Embodiment—FIG. 3 and Screen Shots FIGS. 4-14

An exemplary embodiment 50 according to the inventions is now described with reference to the flow diagram shown in FIG. 3 and the screen shots labeled as FIGS. 4-14.

Figure 4:
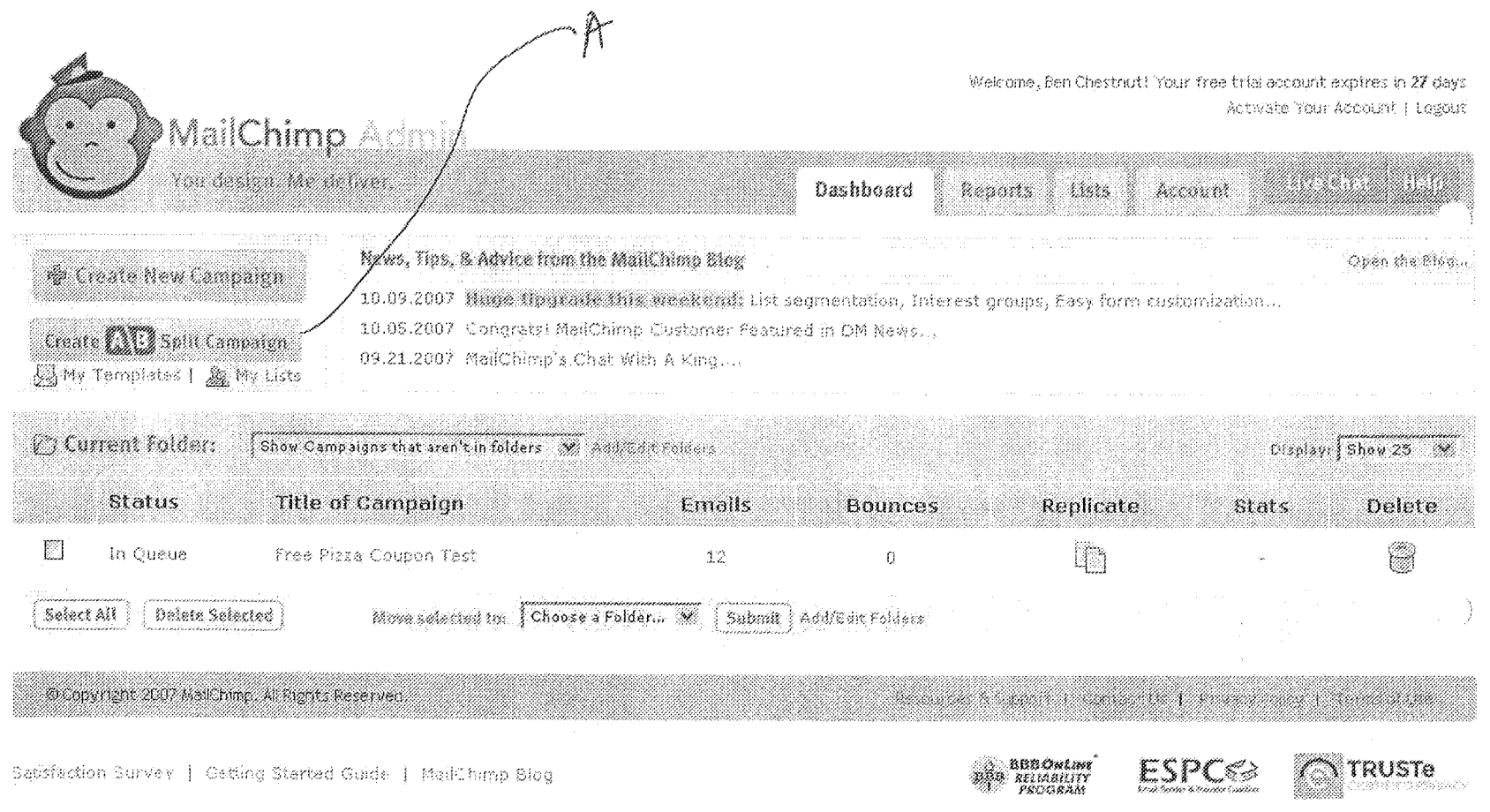

In FIG. 3, after start 52, in action 54 the exemplary embodiment 50 may receive an indicator that a user desires to run a campaign by sending an email to recipients. But prior to sending the email, the user desires the email to be chosen based on A/B split testing. The combination of testing between two mails and sending the winning email is referred to herein as an A/B split campaign. FIG. 4 is a screen shot that includes a button marked "Create A/B Split Campaign" A. A user may provide the indicator that he/she desires to create the campaign by clicking on this button A.

Figure 5:
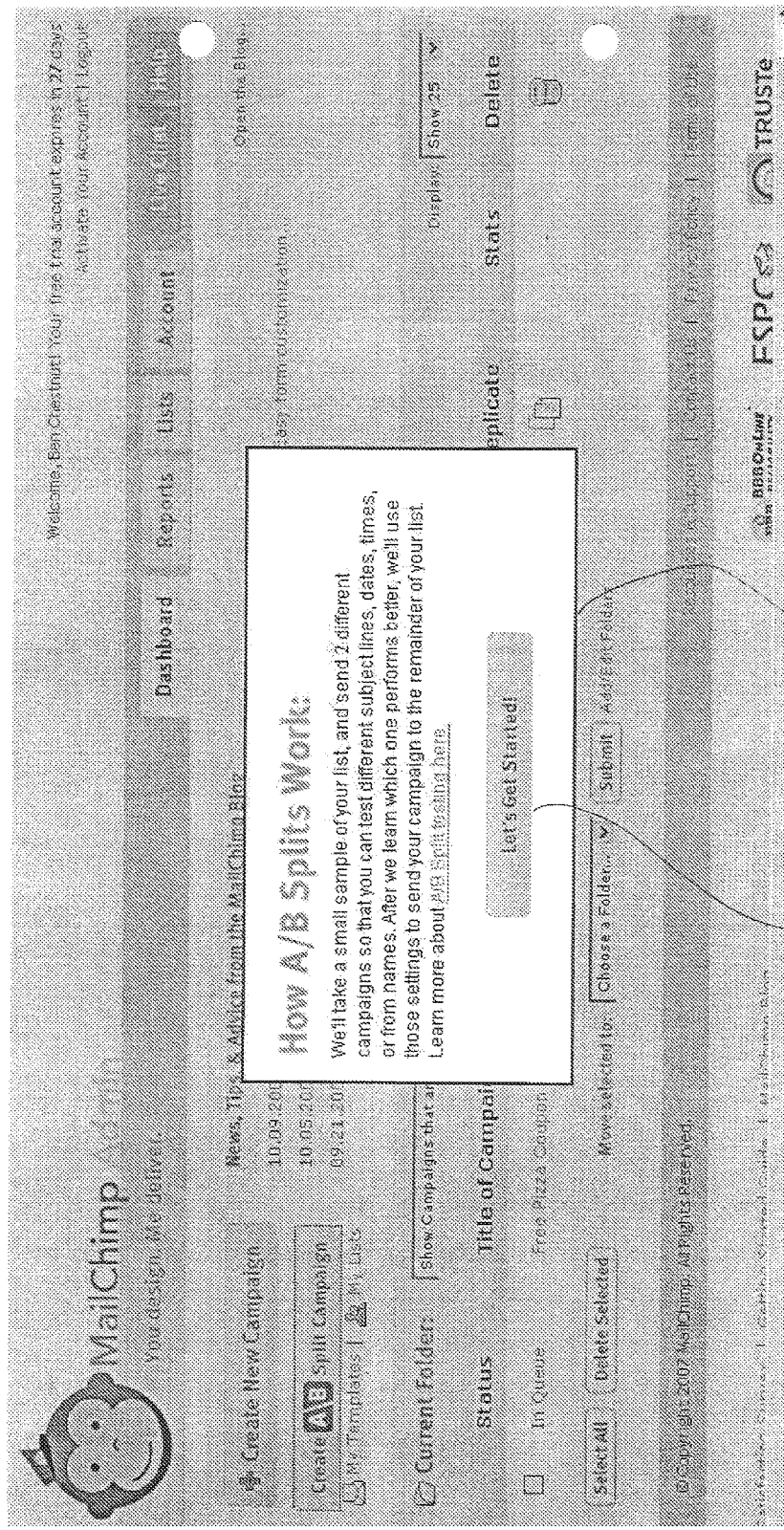

After receiving the indicator in action 55, the exemplary embodiment 50 may display or present in action 56 an optional information window on "How A/B Split Works". FIG. 5 is a screen shot that includes a window B with the information on "How A/B Split Works". In another optional action, the user may click on the "Let's Get Started" button C that is part of the window B to proceed with the A/B split campaign. Thus, in optional action 58 shown in FIG. 3, the exemplary embodiment may receive the positive response to "Let's Get Started".

Figure 6:
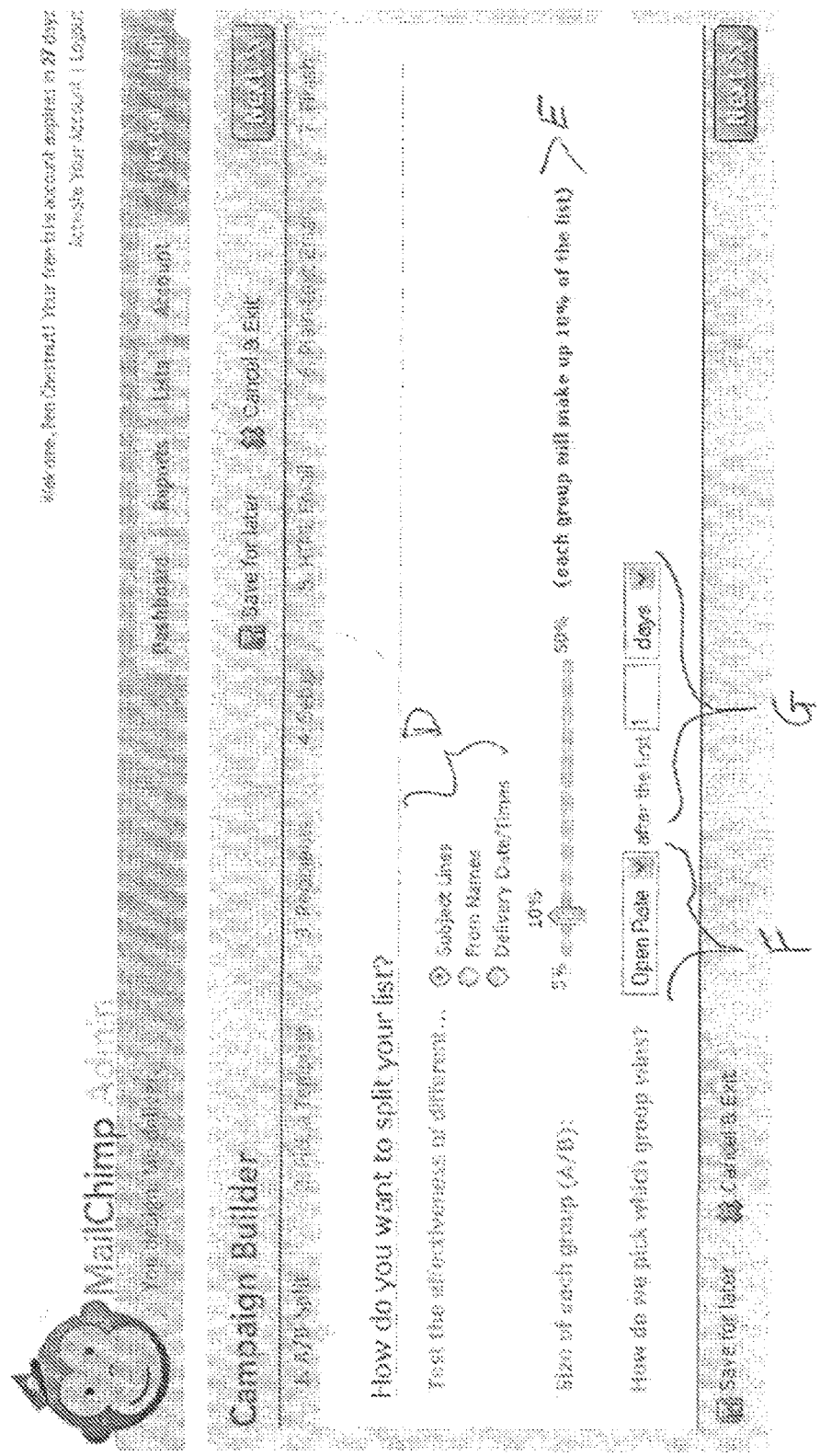

FIG. 3, action 60 presents the user with options available for conducting the A/B split testing. In this embodiment, these options include denominating the manner in which the emails to be tested are different; choosing the size of the test groups or segments; how to pick a winner or preferred email; and when to pick the winner. Other embodiments may have fewer, more, and/or different options for A/B split testing. FIG. 6 is a screen shot that illustrates one way in which these options may be presented.

Difference between emails A and B—In this embodiment, the user may choose to distinguish email A from email B in one of three manners (as indicated by D on the screen shot shown in FIG. 6)—by each of them having: (1) different subject lines; (2) different "from" names; or (3) different delivery date/times. These are only three examples of possible distinguishing features between the tested emails. Fewer, more, and/or different ways in distinguishing emails may be included in other embodiments according to the inventions. For example, other implementations might allow for testing of dates sent, times sent, completely different content, differing content, etc.

As shown at D in FIG. 6, the user selected "subject lines" as the distinguishing feature between the two emails to be tested.

Size of Test Segments—In this embodiment, the user may select the size of the test groups or segments to be sent the emails A and B for testing. The size may be selected based on percentage of recipients in the group or otherwise. Advantageously, a sliding bar is provided for the user's ease in making the size selection as shown at E in FIG. 6. In some embodiments, the user may have complete freedom in choosing the size of the test segments, but in others, the user may not have as broad a choice. For example, the size of the test segments may be linked to one or more of the other options for testing. Also, in another embodiment, a user may be able to choose one test segment to be different in size from the other.

Figure 7:
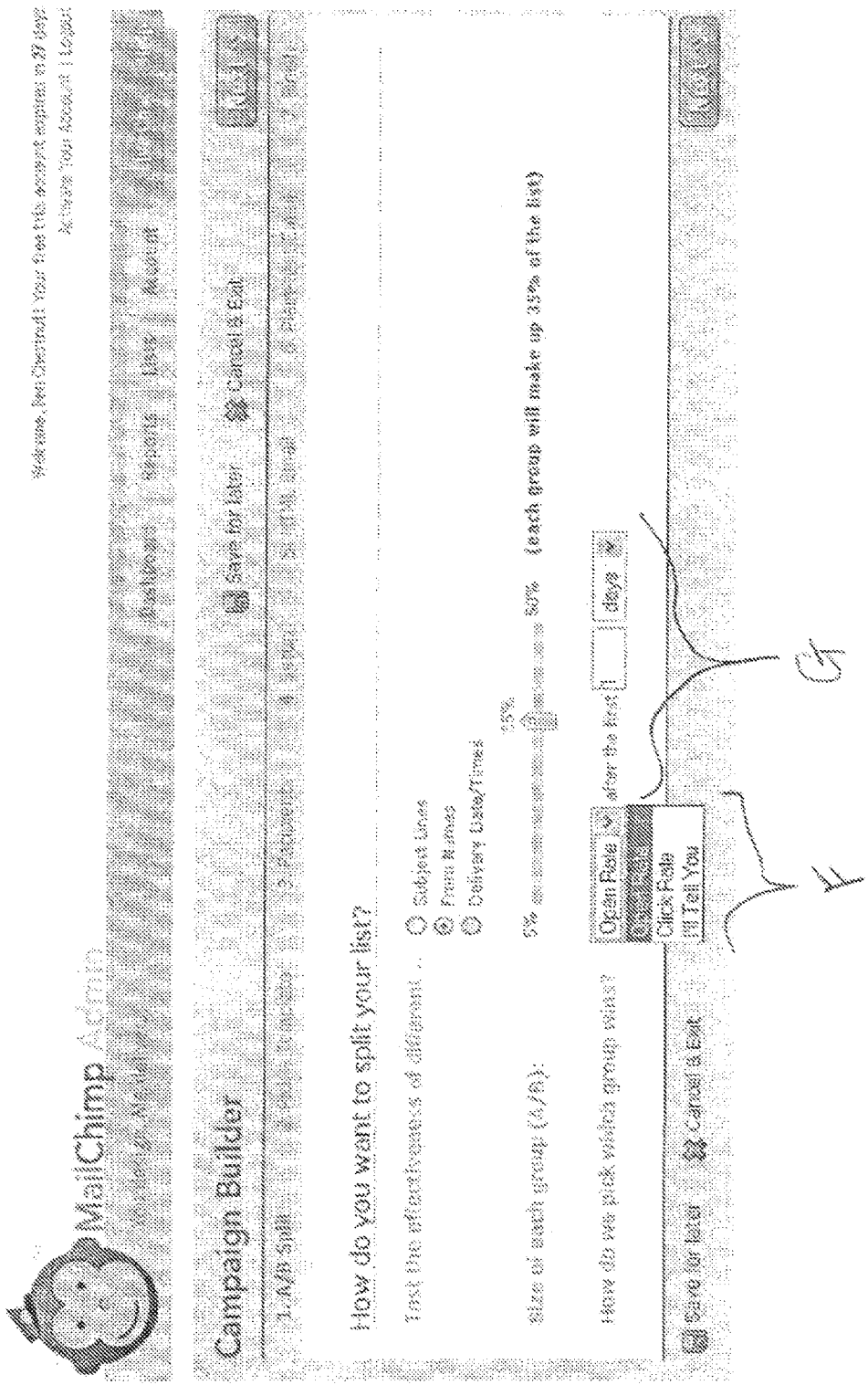

How to Pick Winner—In this embodiment, the user may select how the winner is picked between emails A and B from one of three manners as shown at F of the screen shot labeled FIG. 7. The user may choose to have the preferred embodiment be the email that was opened most (the "open rate"), clicked most (the "click rate"), or the user may choose to pick the winner. The time of winner determination also may be selected by the user or provided by the user as indicated at G on the screen shot labeled FIG. 7.

When to Pick Winner—Advantageously, the user may select when one of the emails is selected as the winner as shown at G in the screen shot of FIG. 7. The user may indicate the winner is to be selected after 1 day from sending (as shown in FIG. 7), at some other time, or when the user makes the selection, and/or otherwise.

Figure 8:
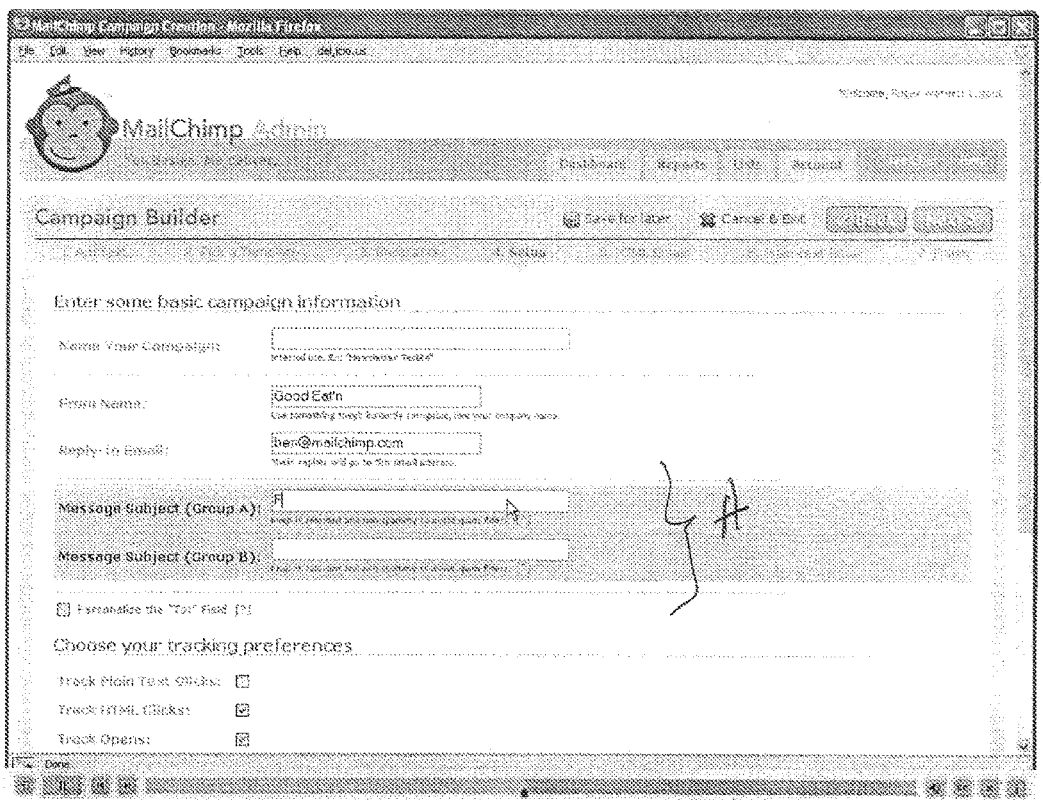
Figure 9:
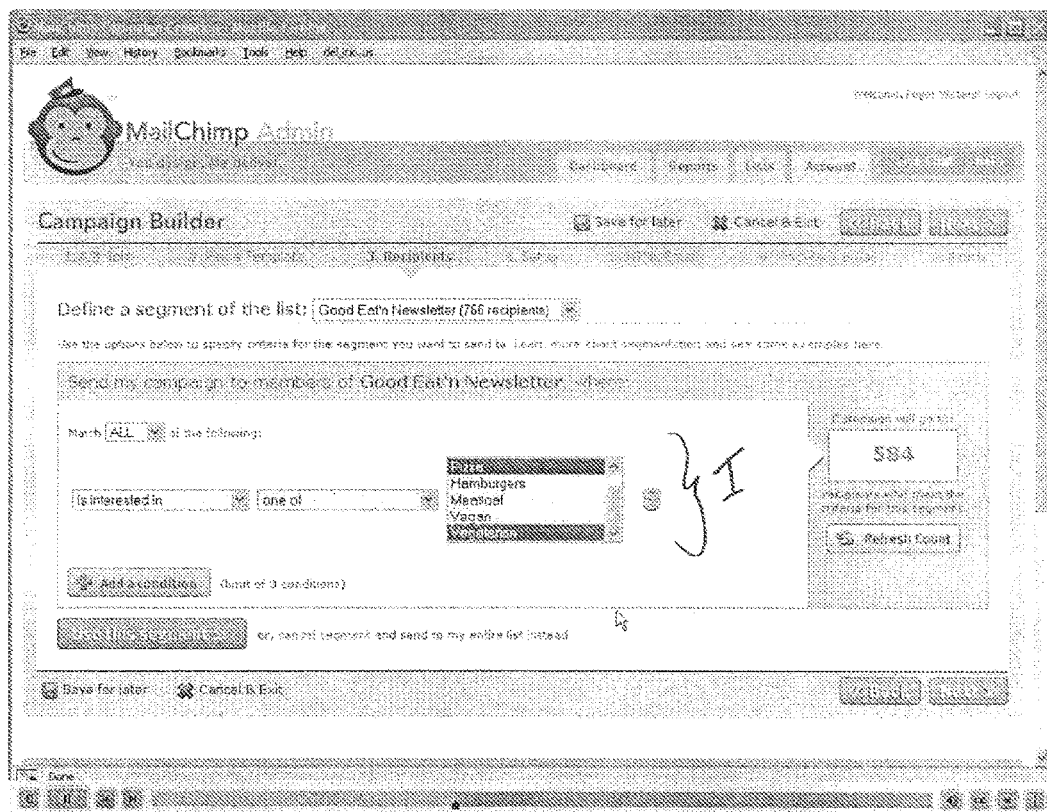
Figure 10:
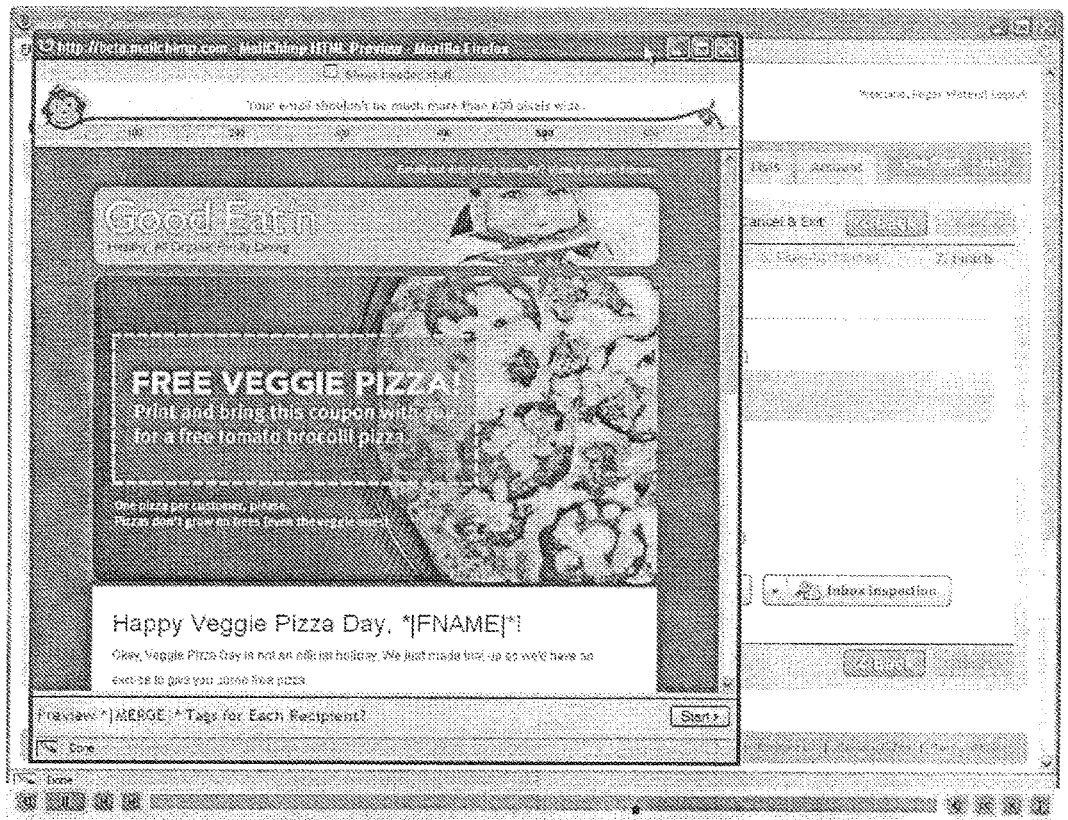

As indicated by FIG. 3, action 62, the selected options are received by the exemplary embodiment. In action 64, the exemplary embodiment presents input areas for the selected differentiator(s) between emails A and B. FIG. 8 illustrates a screen shot at H that shows the user is presented with two different subject lines for the respective emails in this exemplary embodiment. Other embodiments may differ. The user may fill-in the subject lines as he/she desires. In action 66 of FIG. 3, the inputs for differentiator(s) for the two emails are received.

The exemplary embodiment asks the user to select a group of recipients for the A/B campaign as shown in action 68, FIG. 3. The group may be selected from predefined groups or may be created for this A/B campaign (or otherwise). The exemplary embodiment receives the user's choice for the group.

Advantageously, the exemplary embodiment allows the user to choose a subset of recipients from a selected group as the group for the A/B campaign as shown in action 70, FIG. 3. FIG. 8 shows a screen shot 6 where the user has selected the list used for the "Good Eat'n Newsletter" (having 766 recipients) for further segmentation. As indicated at I in FIG. 8, in this case, the user may narrow the list of recipients based on indicated interests. The user has narrowed the list by including only those who indicated an interest in "pizza" and "vegetarian". This reduces the list to a group of 584 for the A/B split campaign. Other embodiments may provide additional, other, or fewer choices for reducing a list. Further, the reduction in a list as described in this paragraph may be an optional feature.

In action 72, FIG. 3, the exemplary embodiment provides tools for creating the content or subject matter of the emails A and B, and in action 74 receives such created content. In addition or alternatively, the embodiment may accept content as created separately by the user and/or otherwise. An exemplary email with content is shown in the screen shot of FIG. 10. Optional actions 76 and 78 as noted in FIG. 3 may allow the user to select other set up options for the A/B split campaign.

Figure 11:
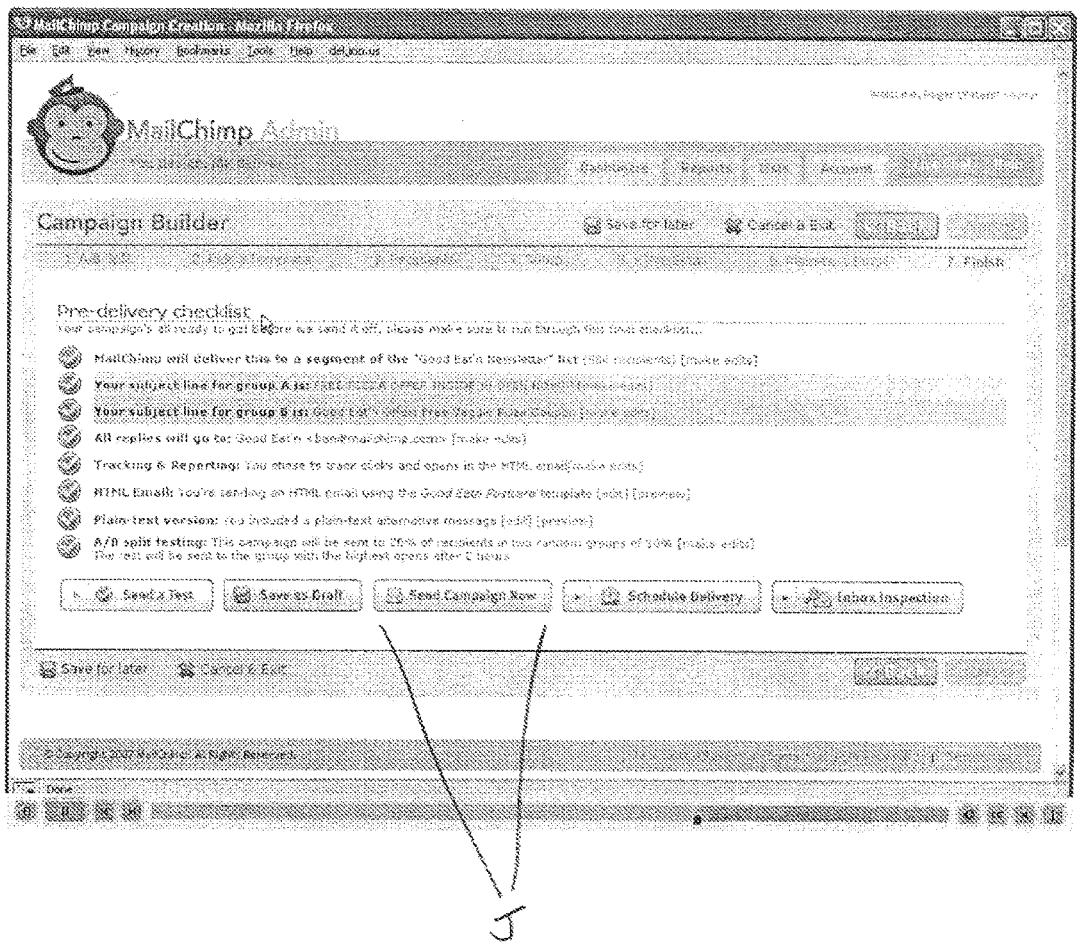
Figure 12:
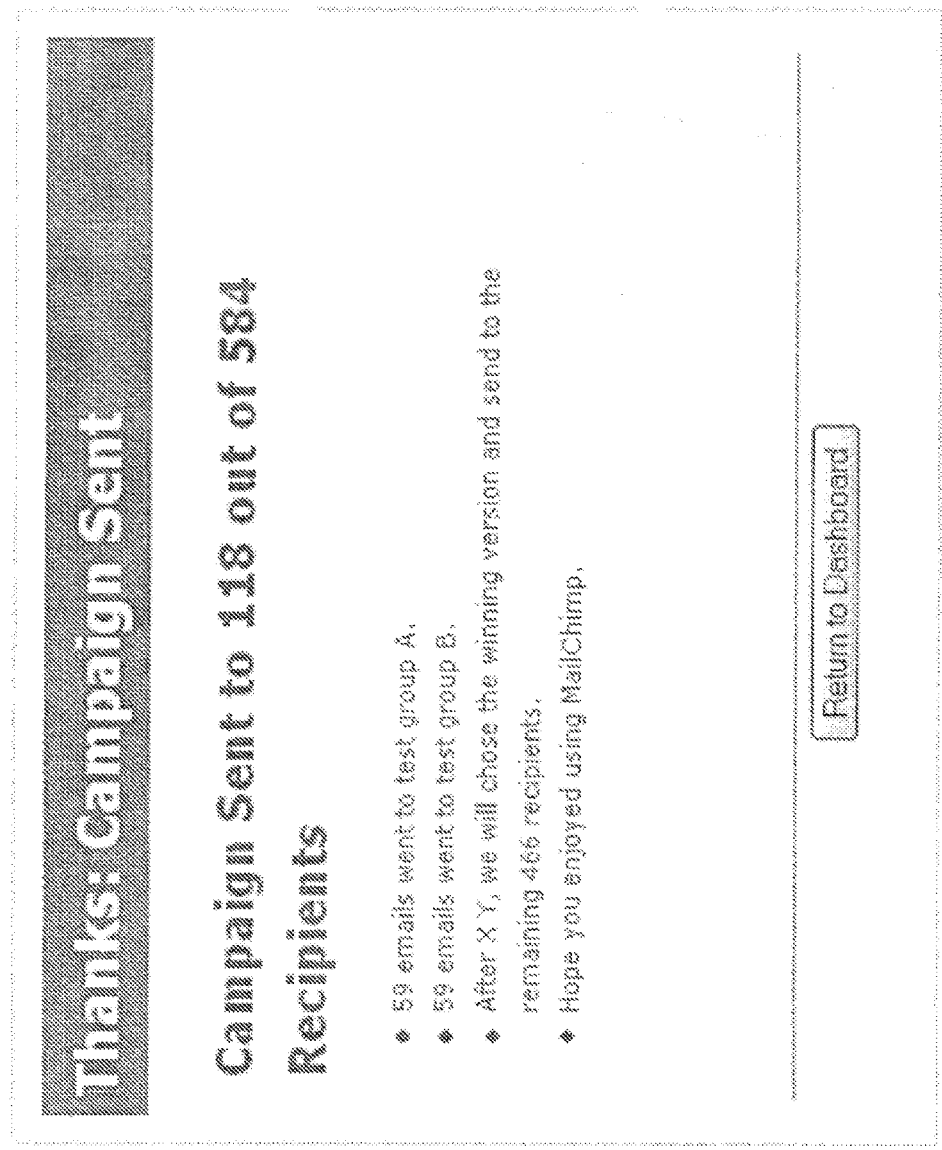

An advantage of the exemplary embodiment is that as indicated at action 80, FIG. 3, and shown in the screen shot of FIG. 11, a "finish process" may be carried out to make sure that the A/B split campaign is set up as desired for the user. FIG. 11 shows that an example of such a finish process is the "Pre-delivery checklist" where the options selected by the user are presented. If the details of the A/B split campaign are set as desired by the user, the user may click on "send campaign now" shown at J in FIG. 3. Other possibilities such as sending a test, saving a draft, and scheduling delivery are shown in FIG. 3 and may be implemented by the user.

By clicking on the "send campaign now", the user initiates the two step sequence of the exemplary embodiment in sending the A and B emails to respective segments of the group of recipients, and then of sending the winning email to the remainder of the group. Thus, in action 82, FIG. 3, the A emails are sent to segment A of the group, and B emails are sent to segment B of the group. The exemplary embodiment returns a message to the user such as shown in screen shot of FIG. 12 with information on the sending of the A and B emails and other details about the A/B split campaign.

The exemplary embodiment may track the A and B emails based on the characteristic selected by the user for selecting a winning or preferred email and/or other characteristic as indicated by action 84, FIG. 3. In action 86, the exemplary embodiment determines the winner between emails A and B as selected by the user and at the time selected by the user. Alternatively, the user may make the selection, and/or otherwise. The exemplary embodiment may keep track of the test recipients receiving the A and B emails so as not to send the test recipients the winning email.

Figure 13:
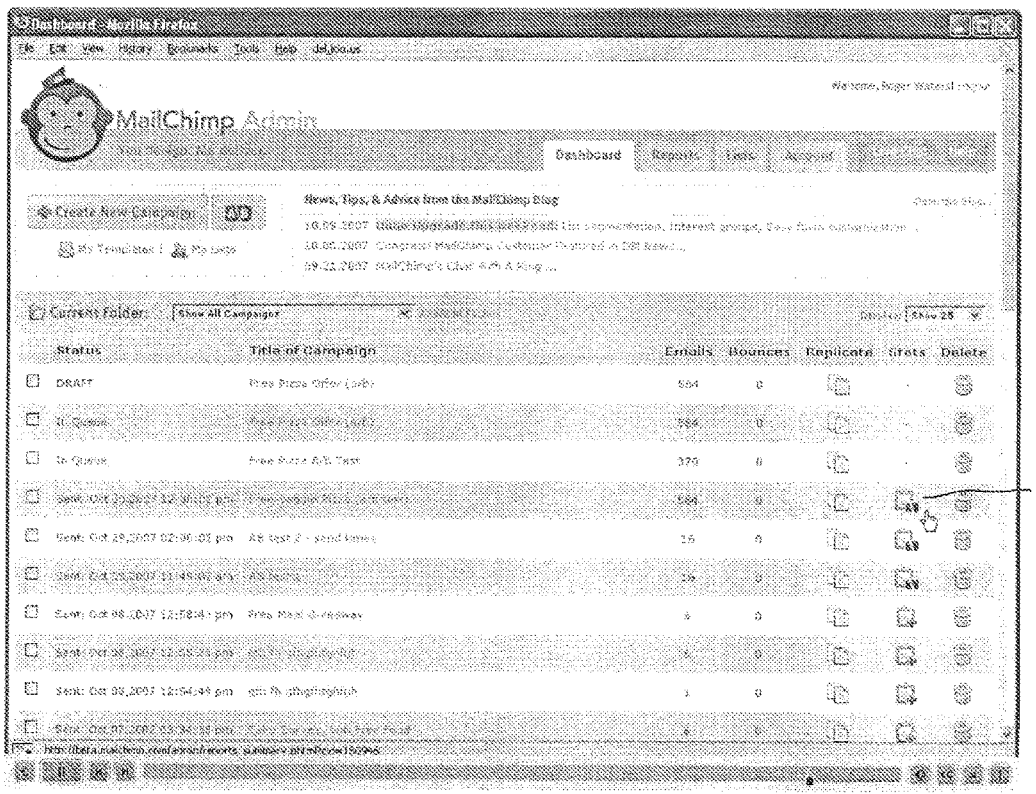
Figure 14:
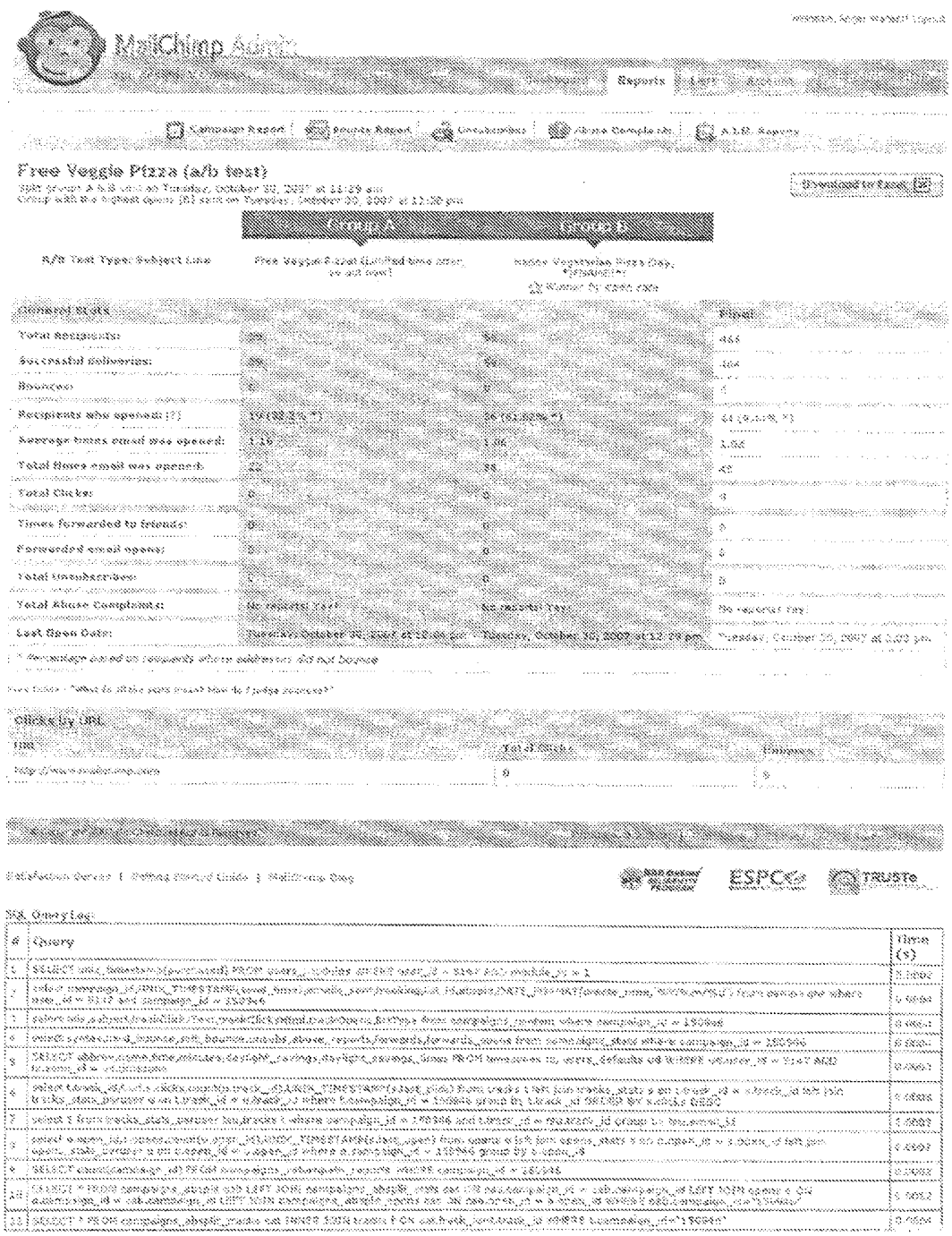

If the user desires to see the status of the A/B split campaign, the user may check a "dashboard" or summary screen as provided by the exemplary embodiment and shown in the screen shot of FIG. 13. The status of the campaign as an "A/B split campaign" is highlighted in the dashboard as shown at K in FIG. 13. The icon including the backward slash "\" indicates that the particular campaign is an A/B split campaign. Thus, at a glance, the user may distinguish the A/B split campaign from others. Other ways of providing information on the status of a campaign as it is underway or finished may be provided by other embodiments.

The exemplary embodiment also provides details regarding the testing conducted during the first part of the A/B split campaign. As shown in the screen shot of FIG. 14, details on the testing between the A and B emails may be provided. The B email is declared the winner in this example.

After the winner has been determined, in action 88, FIG. 3, the exemplary embodiment sends the B email to the remainder of the recipients in the group of recipients. Other embodiments may vary this practice. In this example, the group for the A/B split campaign included a total of 584 recipients. Of the 118 emails sent as part of the testing action, 59 recipients were sent the A email and 59 recipients were sent the B email. These 118 recipients were randomly chosen from the 584 group of recipients. Alternative embodiments may use methods other than random sampling for selecting the test recipients.

Once the winner is determined, the second part of the A/B split campaign may be carried out. The winning email is sent to the remaining 466 recipients in this example. Other embodiments may vary this practice. Advantageously, in this example, the user does not have to take any separate action to have the winning email sent out to the remaining recipients. In this embodiment, the winning email is sent out as soon as it is determined. In other embodiments, the user may specify the date/time the winning email is to be sent out. In either case, the user does not have to take any other action to have the winning email sent out. It happens automatically. In an embodiment, the user may be provided with the opportunity to stop the winning emails from being sent out. In another embodiment, the user may be provided with the opportunity to change or add to the winning email. In another embodiment, no action regarding the winning (or losing) email may be taken until further input from the user or otherwise.

An advantage of the exemplary embodiment is that the test recipients who received the A emails and the B emails are not sent the winning email. In other words, the test recipients are not sent duplicate (at least in content) emails. Thus, complaints about spamming and other negatives due to sending duplicate emails are at least minimized if not eliminated. The exemplary embodiment may keep track of the recipients receiving the test emails A and B so that the embodiment does not send the test recipients the winning email. Other embodiments, of course, may differ in this action and/or others.

As an option, the exemplary embodiment may be made to send the "non-winning" test recipients the winning email. In this option, the recipients who received the A email may be sent the B email. As another option, all test recipients may be made to receive the winning email. In that case, the recipients who received the B email as part of the test will receive a second identical email.

Optionally, the exemplary embodiment may track the winning emails sent out to the remaining recipients in action 90 of FIG. 3, and/or the exemplary embodiment may take other actions or provide other services or opportunities such as providing reports, analysis, etc. regarding the winning emails. The exemplary embodiment ends in action 92.

CONCLUSION

The exemplary embodiments of the present inventions were chosen and described above in order to explain the principles of the invention and their practical applications so as to enable others skilled in the art to utilize the inventions including various embodiments and various modifications as are suited to the particular uses contemplated. The examples provided herein are not intended as limitations of the present invention. Other embodiments will suggest themselves to those skilled in the art.

We claim:
1. A method, comprising:
    providing, by a controller server of an email communication system, a graphical interface having selectable options for a test transmission;
    controlling, by the controller server, transmission of electronic messages based on variations in attributes of the electronic messages, wherein controlling the transmission of the electronic messages comprises:
        receiving, from a user device and via the graphical interface, a first input indicating a size of at least one of a first segment or a second segment,
        determining that the indicated size is impermissible based on an option for the test transmission being specified via the graphical interface,
        preventing the indicated size from being used for the test transmission,
        receiving, from the user device and via the graphical interface, a second input identifying information for the test transmission, wherein the information comprises:
            identification of a group of recipients, the first segment of the group, and the second segment of the group,
            identification of a first electronic message to send to the first segment and a second electronic message to send to the second segment, the second electronic message having a difference from the first electronic message that is perceptible by a recipient, and
            identification of a time period over which to determine an effectiveness of the first electronic message and the second electronic message,
        performing the test transmission by transmitting instructions to an email distribution server of the email communication system, wherein the instructions cause the email distribution server to transmit the first electronic message to the first segment and to transmit the second electronic message to the second segment,
        determining that a number of recipients in the first segment that clicked a link included in the first electronic message during the time period is larger than a number of recipients in the second segment that clicked a link included in the second electronic message during the time period, and based on determining that the number of recipients in the first segment is larger:

selecting a list of recipients from the group of recipients that does not include recipients in the first segment, and performing at least one of:

(i) causing the email distribution server to transmit the first electronic message to the list of recipients immediately after determining that the time period has elapsed and the number of recipients in the first segment is larger, or (ii) causing the email distribution server to transmit the first electronic message to the list of recipients at a time that is subsequent to the time period and that is specified via the graphical interface.

2. The method of claim 1, wherein causing the email distribution server to transmit the first electronic message to the list of recipients comprises providing, to the user device and via the graphical interface, an additional option to prevent transmission of the first electronic message to the list of recipients, wherein the controller server causes the email distribution server to transmit the first electronic message based on an absence of a selection of the additional option.

3. The method of claim 1, wherein selecting the list of recipients from the group of recipients comprises selecting recipients in the second segment and selecting recipients not included in the first segment or the second segment.

4. The method of claim 1, wherein selecting the list of recipients from the group of recipients comprises excluding the recipients in the first segment, and excluding recipients in the second segment.

5. The method of claim 1, further comprising receiving, from the user device and via the graphical interface, an additional input indicating that the effectiveness is to be determined based on a number of clicks, wherein the controller server determines that the number of recipients in the first segment is larger based on receiving the additional input.

6. The method of claim 1, wherein the difference between the first electronic message and the second electronic message comprises at least one of:

subject lines for the first electronic message and the second electronic message;

identifications of senders for the first electronic message and the second electronic message; or delivery times for the first electronic message and the second electronic message.

7. The method of claim 1, wherein providing the graphical interface comprises:

generating the graphical interface by performing operations comprising:

(i) providing a first option for selecting at least one of:

different subject lines for the first electronic message and the second electronic message, different identifications of senders for the first electronic message and the second electronic message, or different delivery times for the first electronic message and the second electronic message, (ii) providing a second option for selecting one of:

determining the effectiveness is to be determined based on a number of clicks, or determining the effectiveness is to be determined based on a number of opened electronic messages, (iii) providing a third option for selecting one of:

including, in the list of recipients, recipients in the second segment, or excluding, from the list of recipients, the recipients in the second segment, and (iv) providing a fourth option for selecting one of:

transmitting a selected one of the first electronic message and the second electronic message to the list of recipients immediately after determining that the time period has elapsed and the number of recipients in the first segment is larger, or the time subsequent to the time period for transmitting the selected one of the first electronic message and the second electronic message, and transmitting the generated graphical interface from the controller server to the user device via a data network;

wherein the second input is received by the controller server from the user device and identifies values selected via the transmitted graphical interface for the first option, the second option, the third option, and the fourth option, wherein the controller server selects, based on the received value for the first option, the first electronic message and the second electronic message for the test transmission, wherein the number of recipients in the first segment that clicked the link included in the first electronic message during the time period is determined based on the received value for the second option indicating that the effectiveness is to be determined based on the number of clicks, wherein the list of recipients is selected based on the received value for the third option, wherein the controller server causes the email distribution server to transmit the first electronic message to the list of recipients at the time corresponding to the received value for the fourth option.

8. A system comprising:

an email distribution server;

a controller server communicatively coupled to the email distribution server via a data network, the controller server comprising:

a memory comprising a data structure in which data identifying a group of recipients and program instructions are stored, and a processor communicatively coupled to the memory, wherein the processor is configured for executing the program instructions and thereby performing operations comprising:

providing a graphical interface having selectable options for a test transmission;

controlling transmission of electronic messages based on variations in attributes of the electronic messages, wherein controlling the transmission of the electronic messages comprises:

receiving, via the graphical interface, a first input indicating a size of at least one of a first segment or a second segment, determining that the indicated size is impermissible based on an option for the test transmission being specified via the graphical interface, preventing the indicated size from being used for the test transmission, receiving, via the graphical interface, a second input identifying information for the test transmission, wherein the information comprises:
identification of the group of recipients, the first segment of the group, and the second segment of the group,
identification of a first electronic message to send to the first segment and a second electronic message to send to the second segment, the second electronic message having a difference from the first electronic message that is perceptible by a recipient, and
identification of a time period over which to determine an effectiveness of the first electronic message and the second electronic message, performing the test transmission by causing the email distribution server to transmit the first electronic message to the first segment and to transmit the second electronic message to the second segment, determining that a number of recipients in the first segment that clicked a link included in the first electronic message during the time period is larger than a number of recipients in the second segment that clicked a link included in the second electronic message during the time period, and based on determining that the number of recipients in the first segment is larger:
selecting a list of recipients from the group of recipients that does not include recipients in the first segment, and
performing at least one of:
(i) causing the email distribution server to transmit the first electronic message to the list of recipients immediately after determining that the time period has elapsed and the number of recipients in the first segment is larger, or
(ii) causing the email distribution server to transmit the first electronic message to the list of recipients at a time that is subsequent to the time period and that is specified via the graphical interface, wherein the email distribution server is configured for transmitting, responsive to instructions from the controller server, the first electronic message to the first segment during the time period, the second electronic message to the second segment during the time period, and the first electronic message to the list of recipients subsequent to the time period.

9. The system of claim 8, wherein causing the email distribution server to transmit the first electronic message to the list of recipients comprises providing, via the graphical interface, an additional option to prevent transmission of the first electronic message to the list of recipients, wherein the controller server is configured for causing the email distribution server to transmit the first electronic message based on an absence of a selection of the additional option.

10. The system of claim 8, wherein selecting the list of recipients from the group of recipients comprises selecting recipients in the second segment and selecting recipients not included in the first segment or the second segment.

11. The system of claim 8, wherein selecting the list of recipients from the group of recipients comprises excluding the recipients in the first segment, and excluding recipients in the second segment.

12. The system of claim 8, the operations further comprising receiving, via the graphical interface, an additional input indicating that the effectiveness is to be determined based on a number of clicks, wherein the controller server is configured for determining that the number of recipients in the first segment is larger based on receiving the additional input.

13. The system of claim 8,
wherein providing the graphical interface comprises:
generating the graphical interface by performing operations comprising:
(i) providing a first option for selecting at least one of:
different subject lines for the first electronic message and the second electronic message,
different identifications of senders for the first electronic message and the second electronic message, or
different delivery times for the first electronic message and the second electronic message,
(ii) providing a second option for selecting one of:
determining the effectiveness is to be determined based on a number of clicks, or
determining the effectiveness is to be determined based on a number of opened electronic messages,
(iii) providing a third option for selecting one of:
including, in the list of recipients, recipients in the second segment, or
excluding, from the list of recipients, the recipients in the second segment, and
(iv) providing a fourth option for selecting one of:
transmitting a selected one of the first electronic message and the second electronic message to the list of recipients immediately after determining that the time period has elapsed and the number of recipients in the first segment is larger, or
the time subsequent to the time period for transmitting the selected one of the first electronic message and the second electronic message, and
transmitting the generated graphical interface from the controller server to a user device via the data network;
wherein the second input is received by the controller server from the user device and identifies values selected via the transmitted graphical interface for the first option, the second option, the third option, and the fourth option,
wherein the controller server is configured for selecting, based on the received value for the first option, the first electronic message and the second electronic message for the test transmission,
wherein the number of recipients in the first segment that clicked the link included in the first electronic message during the time period is determined based on the received value for the second option indicating that the effectiveness is to be determined based on the number of clicks,
wherein the list of recipients is selected based on the received value for the third option, wherein the controller server is configured for causing the email distribution server to transmit the first electronic message to the list of recipients at the time corresponding to the received value for the fourth option.

14. A method performed by a controller server of an email communication system, wherein the method controls transmission of electronic messages based on variations in attributes of the electronic messages, wherein controlling the transmission of the electronic messages comprises:
  receiving, by the controller server, a first input indicating a size of at least one of a first segment or a second segment used in a test transmission;
  determining, by the controller server, that the indicated size is impermissible based on an option for the test transmission being specified via a graphical interface; and
  preventing, by the controller server, the indicated size from being used for the test transmission;
  receiving a second input identifying information for the test transmission, wherein the information comprises:
    identification of a group of recipients, the first segment of the group, and the second segment of the group,
    identification of a time period over which to determine an effectiveness of a first electronic message and a second electronic message, and
    identification of the first electronic message to send to the first segment and the second electronic message to send to the second segment, the second electronic message having a difference from the first electronic message that is perceptible by a recipient wherein the difference between the first electronic message and the second electronic message comprises at least one of:
      subject lines for the first electronic message and the second electronic message,
      identifications of senders for the first electronic message and the second electronic message, or
      delivery times for the first electronic message and the second electronic message,
  performing, by the controller server and based on receiving the second input, the test transmission by communicating instructions to an email distribution server, wherein the instructions cause the email distribution server to transmit the first electronic message to the first segment and to transmit the second electronic message to the second segment,
  determining that a number of recipients in the first segment that, during the time period, either (i) clicked a link included in the first electronic message or (ii) opened the first electronic message is larger than a number of recipients in the second segment that, during the time period, (i) clicked a link included in the second electronic message or (ii) opened the second electronic message, and
  based on determining that the number of recipients in the first segment is larger:
    selecting a list of recipients from the group of recipients that does not include recipients in the first segment, and
    performing at least one of:
      (i) causing the email distribution server to transmit the first electronic message to the list of recipients immediately after determining that the time period has elapsed and the number of recipients in the first segment is larger, or
      (ii) causing the email distribution server to transmit the first electronic message to the list of recipients at a time that is subsequent to the time period and that is specified via the graphical interface.

* * * * *